(12) United States Patent
Park et al.

(10) Patent No.: US 9,300,953 B2
(45) Date of Patent: Mar. 29, 2016

(54) IMAGING APPARATUS AND METHOD OF CONTROLLING THE SAME

(71) Applicant: Samsung Electronics Co., Ltd, Suwon-si, Gyeonggi-do (KR)

(72) Inventors: Ji-woong Park, Suwon-si (KR); Shuichi Shimokawa, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 26 days.

(21) Appl. No.: 14/058,339

(22) Filed: Oct. 21, 2013

(65) Prior Publication Data

US 2014/0340528 A1 Nov. 20, 2014

(30) Foreign Application Priority Data

May 14, 2013 (KR) .................. 10-2013-0054549

(51) Int. Cl.
*H04N 9/64* (2006.01)
*H04N 17/00* (2006.01)
*H04N 5/361* (2011.01)
*H04N 5/355* (2011.01)

(52) U.S. Cl.
CPC ......... *H04N 17/002* (2013.01); *H04N 5/35572* (2013.01); *H04N 5/361* (2013.01)

(58) Field of Classification Search
CPC ...................................................... H04N 5/361
USPC ............................................................ 348/243
See application file for complete search history.

(56) References Cited

U.S. PATENT DOCUMENTS

| | | | |
|---|---|---|---|
| 6,522,357 B2 * | 2/2003 | Beiley et al. | 348/296 |
| 7,317,481 B2 * | 1/2008 | Harada et al. | 348/243 |
| 8,119,990 B2 * | 2/2012 | Zeller | 250/370.09 |
| 2011/0115952 A1 * | 5/2011 | Watanabe | 348/243 |

FOREIGN PATENT DOCUMENTS

| | | |
|---|---|---|
| KR | 2006-0100078 | 9/2006 |
| KR | 2009-0092380 | 9/2009 |

* cited by examiner

*Primary Examiner* — Anthony J Daniels
(74) *Attorney, Agent, or Firm* — Staas & Halsey LLP

(57) ABSTRACT

An imaging apparatus includes an image sensor having a plurality of light receivers that receive light, a detector to detect a monitoring voltage which corresponds to a difference between a dark voltage corresponding to dark current generated from at least one of the plurality of light receivers and a predetermined reset voltage, and a controller to reset the image sensor if the monitoring voltage detected by the detector becomes lower than a threshold voltage. Accordingly, the imaging apparatus can perform divided exposure promptly and accurately to minimize the problem occurring due to dark current.

15 Claims, 7 Drawing Sheets

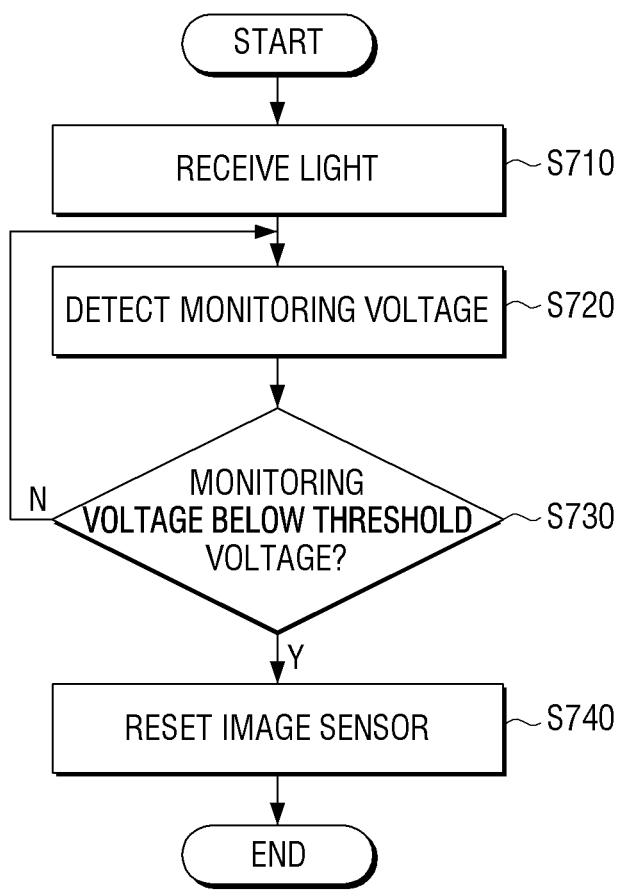

IMAGING APPARATUS AND METHOD OF CONTROLLING THE SAME

CROSS-REFERENCE TO RELATED APPLICATIONS

This application claims priority under 35 U.S.C. §119(a) to Korean Patent Application No. 10-2013-0054549, filed on May 14, 2013, in the Korean Intellectual Property Office, the disclosure of which is incorporated herein by reference in its entirety.

BACKGROUND OF THE INVENTION

1. Field of the Invention

The present general inventive concept relates to an imaging apparatus and a method of controlling the same, and more particularly to an imaging apparatus and a method of controlling the same, which can perform divided exposure.

2. Description of the Related Art

An imaging apparatus receives light through a lens to capture an image. A light receiver of an image sensor acquires the received light, converts the acquired light into an electrical signal, and transmits the electrical signal to an image signal processor.

The light receiver may be implemented by a semiconductor device, such as a photodiode. Accordingly, if the light receiver receives light for a long time, the semiconductor device is deteriorated due to the characteristic of the semiconductor device. In general, dark current due to the deterioration increases by a factor of two whenever temperature is increased by about 6 degrees. As the dark current is increased, the characteristic of a dynamic range of an image sensor is degraded, and this exerts an influence on the picture quality.

In order to solve this problem, various methods have been proposed. For example, in order to prevent the deterioration due to the dark current, conventional methods divided the entire exposure time into n exposure times and calculated the divided exposure times using measured dark current and temperature values. According to this method, however, it is required to calculate respective independent variables for the divided exposure. Accordingly, the above-described method has drawbacks in that it is greatly influenced by the deviation of the independent variables, and therefore it is difficult to control the divided exposure times accurately. For example, since the dark current is measured after the exposure time, it becomes difficult to cope with the temperature displacement during a delay time corresponding to the exposure time. Further, since the measurement deviation of a temperature sensor for the temperature measurement exists, it is difficult to calculate accurate divided exposure times.

Accordingly, there has been a need for a technology which can measure the dark current in real time and can perform accurate divided exposure in real time.

SUMMARY OF THE INVENTION

The present general inventive concept has been made to address at least the above problems and/or disadvantages and to provide at least the advantages described below. Accordingly, the present general inventive concept provides an imaging apparatus and a method of controlling the same, which can measure dark current in real time, and perform divided exposure in real time based on the measured dark current.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an imaging apparatus including an image sensor configured to have a plurality of light receivers that receive light; a detector configured to detect a monitoring voltage which corresponds to a difference between a dark voltage corresponding to dark current generated from at least one of the plurality of light receivers and a predetermined reset voltage; and a controller configured to reset the image sensor if the monitoring voltage detected by the detector becomes lower than a threshold voltage.

The controller may repeat to reset the image sensor whenever the monitoring voltage becomes lower than the threshold voltage while the at least one of the light receivers receives the light.

The detector may include a first detector configured to detect a first monitoring voltage which corresponds to a difference between a dark voltage that corresponds to dark current generated from a first light receiver of the plurality of light receivers and the predetermined reset voltage; and a second detector configured to detect a second monitoring voltage which corresponds to a difference between a dark voltage that corresponds to dark current generated from a second light receiver of the plurality of light receivers and the predetermined reset voltage, wherein the controller resets the image sensor if an average value of the first monitoring voltage and the second monitoring voltage becomes lower than the threshold voltage.

The threshold voltage may be a voltage that is set to correspond to a predetermined photo-sensing speed.

The detector may include an ADC (Analog-to-Digital Converter), the ADC may convert the monitoring voltage into a corresponding digital value to output the digital value, and the controller may reset the image sensor if the digital value becomes lower than a predetermined threshold value.

The foregoing and/or other features and utilities of the present general inventive concept may also be achieved by providing a method of controlling an imaging apparatus including an image sensor having a plurality of light receivers, the method including detecting a monitoring voltage which corresponds to a difference between a dark voltage that corresponds to dark current generated from at least one of the plurality of light receivers that receive light and a predetermined reset voltage; and resetting the image sensor if the detected monitoring voltage becomes lower than a threshold voltage.

The step of resetting the image sensor may repeat to reset the image sensor whenever the level of the monitoring voltage becomes lower than the level of the threshold voltage while the at least one of the light receivers receives the light.

The step of detecting the monitoring voltage may detect a first monitoring voltage which corresponds to a difference between a dark voltage that corresponds to dark current generated from a first light receiver of the plurality of light receivers and the predetermined reset voltage, and may detect a second monitoring voltage which corresponds to a difference between a dark voltage that corresponds to dark current generated from a second light receiver of the plurality of light receivers and the predetermined reset voltage, and the step of resetting the image sensor may reset the image sensor if an average value of the first monitoring voltage and the second monitoring voltage becomes lower than the threshold voltage.

The threshold voltage may be a voltage that is set to correspond to a predetermined photo-sensing speed.

The method for controlling an imaging apparatus according to the aspect of the present general inventive concept may further include converting the detected monitoring voltage into a corresponding digital value to output the digital value, wherein the step of resetting the image sensor resets the image sensor if the digital value becomes lower than a predetermined threshold value.

As described above, according to various embodiments of the present general inventive concept, the divided exposure can be performed in real time.

The foregoing and/or other features and utilities of the present general inventive concept may also be achieved by providing an imaging apparatus comprising an image sensor including a plurality of light receivers to receive light, a detector to detect a monitoring voltage of at least one of the plurality of light receivers, and a controller to reset the plurality of light receivers if the monitoring voltage of the at least one of the plurality of light receivers becomes lower than a threshold voltage.

The monitoring voltage may correspond to a difference between a dark voltage and a predetermined reset voltage, and the dark voltage corresponds to a dark current generated by the at least one of the plurality of light receivers.

The dark current may be current generated in response to deterioration of the at least one of the plurality of light receivers as the at least one of the plurality of light receivers continuously operates through continuous light exposure.

When the monitoring voltage of the at least one of the plurality of light receivers repeatedly becomes lower than the threshold voltage while the at least one of the plurality of light receivers receives light, the controller repeatedly resets the plurality of light receivers while the at least one of the plurality of light receivers continuously receives light.

The foregoing and/or other features and utilities of the present general inventive concept may also be achieved by providing a method of controlling an imaging apparatus, the method including detecting a monitoring voltage of at least one of a plurality of light receivers, and resetting the plurality of light receivers whenever the monitoring voltage of the at least one of the plurality of light receivers becomes lower than a threshold voltage.

The detecting a monitoring voltage may include subtracting a dark voltage from a predetermined reset voltage, the dark voltage corresponding to a dark current generated by the at least one of the plurality of light receivers in response to deterioration of the at least one of the plurality of light receivers as the at least one of the plurality of light receivers continuously operates through continuous light exposure.

The resetting the plurality of light receivers may include repeatedly resetting the plurality of light receivers while the at least one of the plurality of light receivers receives light if the monitoring voltage of the at least one of the plurality of light receivers repeatedly becomes lower than the threshold voltage while the at least one of the plurality of light receivers continuously receives light.

The foregoing and/or other features and utilities of the present general inventive concept may also be achieved by providing a non-transitory computer-readable medium to contain computer-readable codes as a program to perform a method of controlling an imaging apparatus, the method including detecting a monitoring voltage of at least one of a plurality of light receivers, and resetting the plurality of light receivers whenever the monitoring voltage of the at least one of the plurality of light receivers becomes lower than a threshold voltage.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 7 is a flowchart of a method of controlling an imaging apparatus according to an embodiment of the present general inventive concept.

DETAILED DESCRIPTION OF THE PREFERRED EMBODIMENTS

Figure 1:
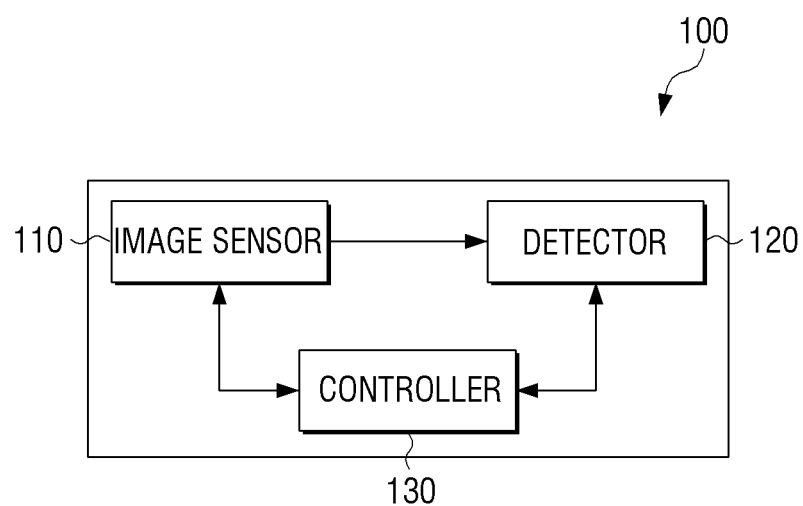
FIG. 1 is a block diagram of an imaging apparatus according to an embodiment of the present general inventive concept.

In the following description of the present general inventive concept, a detailed description of known functions and configurations incorporated herein will be omitted when it may make the subject matter of the present general inventive concept rather unclear. Also, the following terms are defined considering functions of the present general inventive concept, and may be differently defined according to the intention of an operator or custom. Therefore, the terms should be defined based on the overall contents of the specification.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram of an imaging apparatus according to an embodiment of the present general inventive concept.

Referring to FIG. 1, an imaging apparatus 100 includes an image sensor 110, a detector 120, and a controller 130.

The imaging apparatus 100 may be implemented by a digital camera, a smart phone, a camcorder, a digital TV, a notebook computer, a tablet PC, or the like, so long as the apparatus may take digital pictures and/or record digital video recordings.

The image sensor 110 serves as a film of a film camera. Specifically, light that is received through a lens reaches the image sensor 110. The image sensor 110 includes a plurality of light receivers (not illustrated) that receive the light. In general, the light receiver is implemented by a photodiode. The photodiode senses the received light and converts the sensed light into an electrical signal. The sensed light is converted into digital information, such as brightness, color, and coordinates according to the strength and position of the light. In the image sensor 110, a complementary metal oxide semiconductor (CMOS) and a charge coupled device (CCD) may be provided.

The detector 120 may detect a monitoring voltage which corresponds to a difference between a dark voltage corresponding to dark current generated from at least one of the plurality of light receivers and a predetermined reset voltage.

The dark current is current that is generated due to deterioration of the light receiver that is implemented by a semiconductor device as the light receiver continuously operates through continuous exposure. The dark voltage is a voltage that is proportional to the dark current. The reset voltage is a voltage of a portion where a reset circuit and the light receiver are connected to each other. That is, the reset voltage is an initial voltage of the light receiver and not a voltage when an actual reset signal is generated. Accordingly, the initial monitoring voltage that is detected by the detector 120 is equal to the level of the reset voltage. However, if the light receiver is deteriorated due to continuous exposure, dark current is generated in the light receiver. The dark voltage is generated in proportion to the dark current, and the monitoring voltage that is detected by the detector 120 is gradually lowered.

The detector 120 may detect the monitoring voltage from the light receiver that is implemented for one pixel in the image sensor 110. A pixel of the image sensor 110, from which the monitoring voltage is detected, is a monitoring pixel. A plurality of monitoring pixels may be set.

If two monitoring pixels are set, there may be provided a first detector (not illustrated) to detect a first monitoring voltage which corresponds to a difference between a dark voltage corresponding to dark current generated from a first light receiver and the predetermined reset voltage, and a second detector (not illustrated) to detect a second monitoring voltage which corresponds to a difference between a dark voltage corresponding to dark current generated from a second light receiver and the predetermined reset voltage. If a plurality of monitoring pixels is set and a plurality of corresponding detectors are implemented, as described above, the monitoring voltage may be calculated by averaging the first and second monitoring voltages. Although the above describes utilizing first and second monitoring pixels and corresponding detectors, the present general inventive concept is not limited thereto. For example, three or more monitoring pixels and corresponding detectors may be set.

The detector 120 may include an Analog-to-Digital Converter(ADC). The ADC may convert the monitoring voltage into a corresponding digital value to output the converted digital value. A detailed example thereof will be described later.

The controller 130 may reset the image sensor 110 if the monitoring voltage detected by the detector 120 becomes lower than a threshold voltage. The threshold voltage may be set in consideration of a range where an image can be expressed by the light received in the light receiver.

One or two monitoring pixels detecting the monitoring voltage may be a part of the whole image sensor 110, but if the monitoring voltage becomes lower than the threshold voltage, the whole image sensor 110 is reset. To reset the image sensor 110 is to reset all the light receivers (e.g., photodiodes) implemented in the respective pixels. If the image sensor 110 is exposed to light for a long time (e.g., if a shutter speed is low), the controller 130 repeats the above-described operation. That is, while the light receiver of the monitoring pixel receives light, the detector 120 continuously detects the monitoring voltage in real time. Further, the controller 130 repeatedly resets the image sensor 110 whenever the monitoring voltage becomes lower than a threshold value while the light receiver of the monitoring pixel continuously receives light. Through this process, the imaging apparatus 100 may perform divided exposure.

If a plurality of monitoring pixels is provided, a plurality of monitoring voltages is also presented. In this case, the controller 130 may calculate an average of the respective monitoring voltages, and if the calculated average monitoring voltage becomes lower than the threshold voltage, the controller 130 may reset the image sensor 110.

Up to now, the process of performing the divided exposure has been described based on the block diagram of the imaging apparatus 100. Hereinafter, dark current generated in the light receiver and a potential well corresponding to sensitivity will be described.

Figure 2:
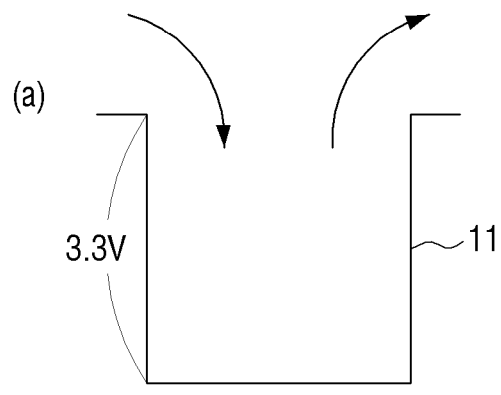
FIGS. 2A to 2C are diagrams explaining dark current according to the present general inventive concept.
Figure 2:
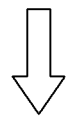
Figure 2:
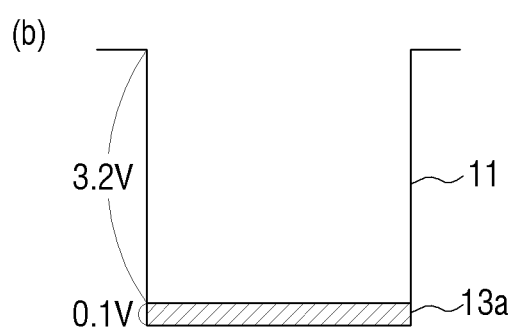
Figure 2:
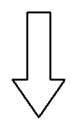
Figure 2:
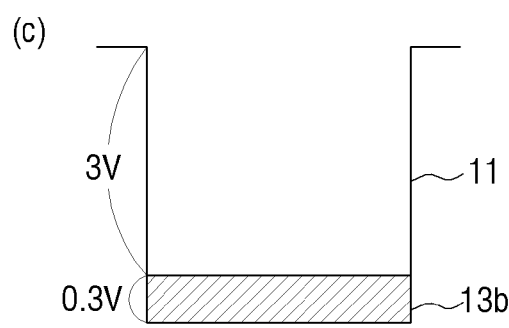

FIGS. 2A to 2C are diagrams illustrating dark current according to the present general inventive concept.

FIG. 2A illustrates a potential well 11 of one photodiode. If light of sufficient photon energy is received in the diode, transported electrons and positive (+) holes are generated in the photodiode, and the electrons are activated. The electrons that have received energy are excited from a ground state to a conduction band, and current flows through the photodiode. In FIG. 2A, light reception is indicated by an input arrow and current flow is indicated by an output arrow. If current flows, a voltage is generated in proportion to a resistance component. In FIG. 2A, it is assumed that the maximum voltage that the photodiode can output is 3.3 V.

On the other hand, if a semiconductor device operates in a photoconduction method, dark current flows through the semiconductor device. The dark current includes photocurrent generated by saturation current of a semiconductor junction. This dark current causes noise.

FIG. 2B explains a dark voltage that is generated by the dark current. As illustrate in FIG. 2A, it is assumed that the potential well 11 of the photodiode can output a maximum voltage of 3.3 V. If a dark voltage 13a of 0.1 V is generated by the dark current generated in the photodiode, the maximum voltage of the photodiode becomes 3.2 V. If the photodiode is in an on state, the dark current and the dark voltage may be continuously increased, as illustrated in FIG. 2C.

The dark voltage 13b of 0.3 V, as illustrated in FIG. 2C, is generated due to the continuous dark current. In this case, the maximum voltage that the photodiode can output becomes 3 V. As described above, the dark current that is generated in a photoconduction type semiconductor device degrades the performance of the semiconductor device and acts on the image sensed by the image sensor 110 as noise.

Up to now, the dark current has been described using a potential well 11. Next, the relationship with sensitivity will be described using the potential well 11.

Figure 3:
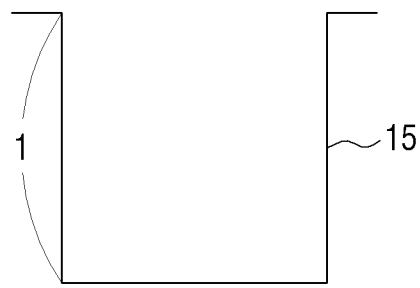
FIGS. 3A to 3C are diagrams illustrating a potential well that corresponds to a photo-sensing speed according to an embodiment of the present general inventive concept.
Figure 3:
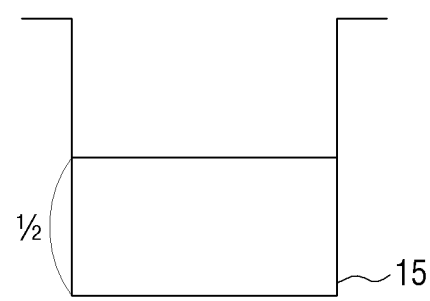
Figure 3:
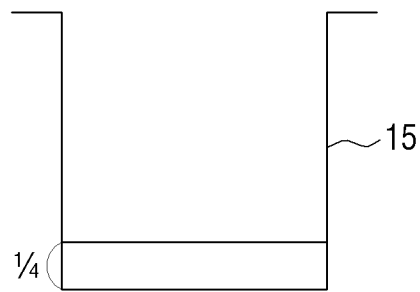

FIGS. 3A to 3C are diagrams illustrating a potential well that corresponds to a photo-sensing speed according to an embodiment of the present general inventive concept.

The photo-sensing speed is a ratio of speed in which the imaging apparatus 100 reacts on light. A digital camera follows International Standards Organization (ISO) 12232:1998 standards. In general, it is indicated that ISO mainly uses a linear scale. The ISO linear scale corresponds to the former American Standard Association(ASA) linear scale, and if the photo-sensing speed increases by a factor of two, the photo-sensing value also increases by a factor of two. A compact digital camera may normally have ISO 50-3200 values, and the Digital Single Lens Reflex (DSLR) may normally have ISO 100-6400 values. As the ISO value becomes larger, the sensing speed becomes faster to get a little exposure, and this means that the depth of field can be deepened by using a fast shutter speed or by adjusting the iris in the above-described light quantity state.

In general, heightening the ISO may be performed using two methods as follows. The first method is a method of amplifying a signal using an analog amplifier and the second method is a method of increasing a digital value. For example, the method of amplifying the signal with the analog amplifier is performed before the signal passes through an analog-to-digital conversion circuit. The second method of increasing the digital value is performed through a binary shift operation, and a digital value that is obtained from the analog-to-digital conversion circuit is used in the second method.

FIG. 3A illustrates a potential well of the light receiver in the case where the ISO of the imaging apparatus, which indicates the photo-sensing speed, is set to 100. As an example, the potential well 15 of the light receiver may receive the light and convert the light into an electrical signal to output the electrical signal. Here, it is assumed that the maximum voltage that the light receiver, which receives the light, can output is "1". It should be noted that "1" is not an absolute voltage value, but instead is a relative value. That is, in the ISO 100, it is necessary that the voltage value that the light receiver can maximally output is "1" in order to express an image. Here, the image expression is image information, such as brightness information or color information.

FIG. 3B illustrates the potential well of the light receiver in the case where the ISO is set to 200. As described above, in a case where the imaging apparatus 100 uses a linear scale with respect to the photo-sensing speed, and if the photo-sensing speed increases by a factor of two, as described above, the image having the same brightness may be expressed with ½ of the light quantity. That is, since the imaging apparatus 100 can acquire image information with ½ of the light quantity in ISO 200 as compared with ISO 100, the necessary output voltage value becomes ½ as compared with that illustrated in FIG. 3A.

FIG. 3C illustrates the potential well of the light receiver in the case where the ISO is set to 400. In the same manner, in a case where the imaging apparatus 100 uses a linear scale with respect to the photo-sensing speed, and if the photo-sensing speed increases by a factor of four, the image having the same brightness can be expressed with ¼ of the light quantity, and thus the necessary light quantity becomes ¼. Accordingly, the necessary output voltage value also becomes ¼ in proportion to the light quantity.

The imaging apparatus 100 may set the necessary output voltage value, as described above with reference to FIGS. 3A, 3B, and 3C, as the threshold voltage value. As described above, the imaging apparatus 100 may always maintain the necessary output voltage value by setting the necessary output voltage value according to the photo-sensing speed as the threshold voltage and resetting the image sensor whenever the monitoring voltage becomes lower than the threshold voltage.

The above-described voltage value is merely exemplary, and the present general inventive concept is not limited thereto. For example, the relative voltage value may actually have a slight difference depending on the performances or implementation methods of the image sensor 110 and an image signal processor (not illustrated). For example, the necessary voltage values that are set to correspond to the photo-sensing speeds may be set by additionally adding or subtracting minute voltage values related to image processing or elements.

As described above with reference to FIG. 2, the voltage which may be output by the light receiver due to dark current generated in the light receiver is lowered. However, if the photo-sensing speed is heightened and thus the necessary voltage value is decreased, an extra value of the voltage value is relatively increased in the imaging apparatus 100, and thus exposure for a relatively long time becomes possible.

Up to now, the configuration of the imaging apparatus 100 has been described based on the block diagram illustrated in FIG. 1, and the relationship between the dark current and the photo-sensing speed has been described based on the potential well of the light receiver. Hereinafter, a process of performing the divided exposure through detection of the monitoring voltage through the imaging apparatus 100 will be described.

Figure 4:
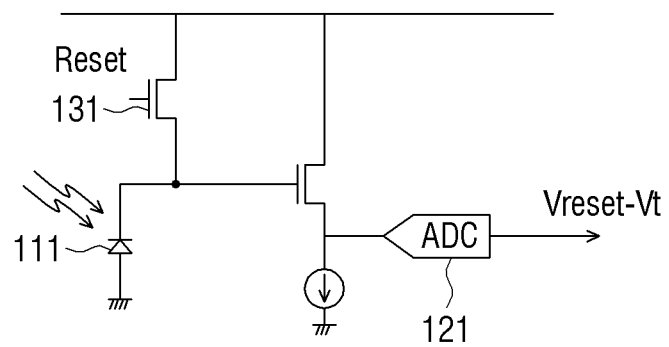
FIG. 4 is a diagram illustrating a method of detecting a monitoring voltage according to an embodiment of the present general inventive concept.

FIG. 4 is a diagram illustrating a method of detecting a monitoring voltage according to an embodiment of the present general inventive concept.

Referring to FIG. 4, the detailed configuration of a monitoring pixel and a detector is illustrated. The monitoring pixel is provided with a light receiver 111. The light receiver 111 receives light, converts the received light into an electrical signal, accumulates the electric signal, and transmits the accumulated electrical signal to an image signal processor (not illustrated) in accordance with a readout signal. For example, one pixel can include one light receiver.

The detector 120 may further include an Analog-to-Digital Converter(ADC) 121. The ADC 121 converts an analog value into a digital value. That is, the ADC may divide the voltage value into predetermined sections according to the number of bits, and output the voltage value that corresponds to the divided section as a digital value. For example, if it is assumed that the entire voltage value is 3.3 V, and the number of bits is 12 bits, 4096 digital values are provided as a whole. Accordingly, if 3.3 V is divided by 4096, one section corresponds to about 0.81 mV. That is, if the output voltage value is 0.4 mV, the ADC outputs "0", while if the output voltage value is 1 mV, the ADC outputs "1". The digital value output to the ADC may be expressed as a code. That is, if the output digital value is 1024, it may be expressed as 1024 code, while if the output digital value is 1029, it may be expressed as 1029 code. In the present general inventive concept, for convenience, explanation will be made on the basis of the voltage value.

If the light receiver 111 operates, the initial reset voltage value Vreset of the ADC 121 is measured. The reset voltage value is a voltage that is applied to the reset circuit, and may be a voltage of the light receiver. If the light receiver 111 receives light through continuous exposure, dark current may be generated in the light receiver 111. Dark voltage Vt may also be generated in proportion to the dark current. Due to the generated dark voltage Vt, the voltage that is applied to the ADC 121 is gradually decreased. That is, in the ADC 121, the monitoring voltage that corresponds to the difference between the reset voltage and the dark voltage (Vreset−Vt) is detected.

If the detected monitoring voltage becomes lower than a predetermined threshold voltage, a reset signal is applied from the controller 130 to a reset switch 131. If a reset is performed, the light receiver 111 returns to the initial state, and the initial reset voltage of the ADC 121 is detected as the monitoring voltage.

Through repetition of the above-described processes, the imaging apparatus 100 can monitor the dark current in real time, and can promptly perform the divided exposure process.

On the other hand, the circuit illustrated in FIG. 4 is to detect dark voltage that is caused by the dark current generated in the light receiver, and a light receiving circuit (not illustrated) related to image information may exist separately.

Figure 5:
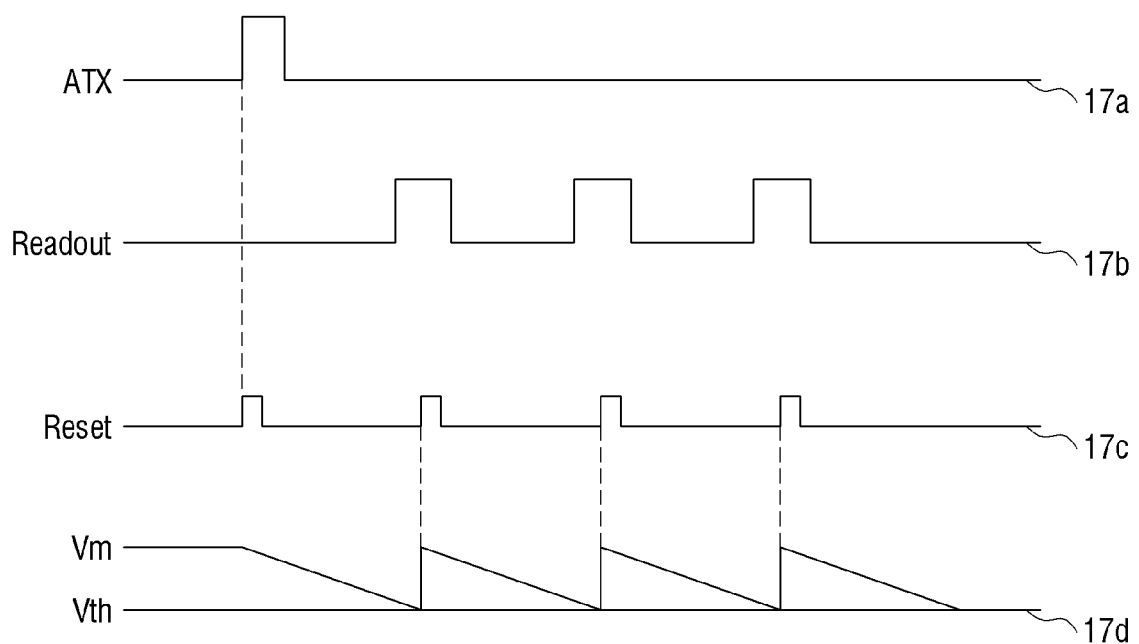
FIG. 5 is a diagram illustrating a method of performing divided exposure according to an embodiment of the present general inventive concept.

FIG. 5 is a diagram illustrating a method of performing divided exposure according to an embodiment of the present general inventive concept.

Referring to FIG. 5, an Advanced Technology Extended (ATX) signal is applied (17a). The ATX signal indicates that a shutter is pressed. That is, if the shutter is pressed, the light receiver 111 of the image sensor 110 receives the light. If the ATX signal becomes high and then becomes low, the image sensor 110 continuously receives the light as indicated by readout signal at (17b). Reset is performed along with the application of the ATX signal as indicated at (17c). If the reset is performed, the monitoring voltage Vm that is detected by the detector 120 becomes the same value as the reset voltage as indicated at (17d). As described above, the reset voltage is the same voltage as the initial voltage of the light receiver.

If the exposure continues and the light receiver 111 receives the light, dark current is generated due to the deterioration of the light receiver 111, and dark voltage is generated in proportion to the dark current, as described above. In this case, the detector 120 detects the monitoring voltage Vm as high as the difference between the reset voltage and the dark voltage Vt. If the monitoring voltage Vm becomes lower than the threshold voltage Vth, the controller 130 resets the image sensor 110. Here, the reset of the image sensor 110 means to reset the light receivers provided in the image sensor 110, and thus the light receiver provided in the monitoring pixel is also reset as indicated at (17d). By resetting the light receiver, the light receiver may maintain the initial voltage, and the monitoring voltage that is detected by the detector 120 becomes the reset voltage value as indicated at (17d). On the other hand, the electrical signal that is received and converted by the light receiver before the reset is performed is transmitted to the image processor according to a readout signal.

The detector 120 detects the monitoring voltage Vm in real time while the exposure of the image sensor 110 continues. Then, if the monitoring voltage Vm becomes lower than the threshold voltage Vth, the controller 130 resets the image sensor 110.

While the exposure continues, the imaging apparatus 100 detects the monitoring voltage Vm in real time, and repeatedly resets the image sensor 110. Accordingly, the imaging apparatus 100 can perform the divided exposure process during long-term exposure.

Figure 6:
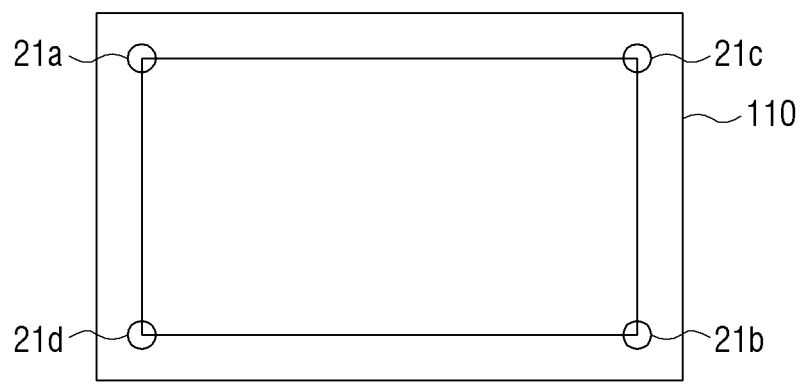
FIG. 6 is a diagram illustrating an arrangement of monitoring pixels according to an embodiment of the present general inventive concept.

FIG. 6 is a diagram illustrating an arrangement of monitoring pixels according to an embodiment of the present general inventive concept.

Referring to FIG. 6, an image sensor 110 and a plurality of monitoring pixels 21a, 21b, 21c, and 21d are illustrated. In FIG. 6, four monitoring pixels 21a, 21b, 21c, and 21d are illustrated. However, the present general inventive concept is not limited thereto. For example, one monitoring pixel may be provided. Further, although FIG. 6 illustrates monitoring pixels that are located at corner areas of the image sensor 110, the present general inventive concept is not limited thereto. For example, the monitoring pixels may be located at arbitrary positions.

The image sensor 110 includes a plurality of pixels, and each pixel has a light receiver that receives light and converts the received light into an electrical signal. Here, the monitoring pixel has the same structure as a general pixel, and the light receiver provided in the monitoring pixel may be provided with a circuit that is connected to the detector 120 to detect the monitoring voltage. Accordingly, the light receiver provided in the monitoring pixel transmits the dark voltage due to the dark current to the detector 120, and the detector 120 resets the image sensor 110 if the detected monitoring voltage becomes lower than the predetermined threshold voltage Vth.

On the other hand, in the case where a plurality of monitoring pixels are provided as described above, the controller 130 may reset the image sensor 110 if the average value of the respective monitoring voltages detected from the respective monitoring pixels becomes lower than the threshold voltage Vth.

FIG. 7 is a flowchart of a method of controlling an imaging apparatus according to an embodiment of the present general inventive concept.

Referring to FIG. 7, the imaging apparatus receives light (S710). The imaging apparatus includes an image sensor 110. Each pixel of the image sensor 110 includes a light receiver, and the light receiver receives the light and converts the received light into an electrical signal.

The imaging apparatus detects a monitoring voltage (S720). If the light receiver receives the light, dark current due to the light receiver's deterioration is generated, and dark voltage is generated in proportion to the dark current, as described above. The monitoring voltage is a difference between the reset voltage, which may be an initial voltage, and the generated dark voltage.

The imaging apparatus compares the monitoring voltage Vm and the threshold voltage Vth with each other (S730). The threshold voltage Vth is a voltage that is set to correspond to the photo-sensing speed. The imaging apparatus compares the monitoring voltage Vm and the threshold voltage Vth with each other, and if the monitoring voltage Vm is higher than the threshold voltage Vth, the imaging apparatus continuously detects the monitoring voltage Vm, and again compares the detected monitoring voltage Vm with the threshold voltage Vth.

If the monitoring voltage Vm becomes lower than the threshold voltage Vth, the imaging apparatus resets the image sensor 110 (S740). Resetting the image sensor 110 means resetting all the light receivers provided in the image sensor 110, and the light receiver provided in the monitoring pixel to detect the monitoring voltage Vm is also reset.

In the above-described embodiments, the imaging apparatus can detect the monitoring voltage Vm in real time, and can minimize the influence of dark current by performing the divided exposure through comparison of the detected monitoring voltage Vm and the threshold voltage Vth. Further, since a complicated calculation process or temperature measurement process is not necessary, the imaging apparatus is less influenced by the deviation of the independent variables, and the divided exposure can be promptly performed.

The method of controlling an imaging apparatus according to various embodiments as described above may be implemented by a program to be provided to the imaging apparatus.

As an example, a non-transitory computer readable medium may be provided, which stores the program that performs detecting a monitoring voltage which corresponds to a difference between a dark voltage that corresponds to dark current generated from at least one of the plurality of light receivers that receive light and a predetermined reset voltage, and resetting the image sensor if the detected monitoring voltage becomes lower than a threshold voltage.

The non-transitory computer readable medium is not a medium that stores data for a short period, such as a register, a cache, or a memory, but may be a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An imaging apparatus comprising:
   an image sensor configured to have a plurality of light receivers that receive light;
   a detector configured to detect a monitoring voltage which corresponds to a difference between a dark voltage corresponding to dark current generated from at least one of the plurality of light receivers and a predetermined reset voltage; and
   a controller configured to reset the image sensor if the monitoring voltage detected by the detector becomes lower than a threshold voltage,
   wherein the controller repeatedly resets the image sensor whenever the monitoring voltage becomes lower than the threshold voltage while the at least one of the light receivers receives the light, and
   the threshold voltage is a voltage that is set to correspond to a predetermined photo-sensing speed.

2. The imaging apparatus as claimed in claim 1, wherein the detector comprises an Analog-to-Digital Converter (ADC),
   the ADC converts the monitoring voltage into a corresponding digital value to output the digital value, and
   the controller resets the image sensor if the digital value becomes lower than a predetermined threshold value.

3. The imaging apparatus as claimed in claim 1, wherein the detector detects the monitoring voltage for each of a predetermined number of light receivers among the plurality of light receivers,
   the predetermined number of light receivers is less than the plurality of light receivers,
   the predetermined number of light receivers are selected to be at predetermined positions of the image sensor, and
   the controller resets the entire image sensor whenever one or more of the monitoring voltages corresponding to the predetermined number of light receivers becomes lower than the threshold voltage while the at least one of the light receivers receives the light.

4. An imaging apparatus comprising:
   an image sensor configured to have a plurality of light receivers that receive light;
   a detector configured to detect a monitoring voltage which corresponds to a difference between a dark voltage corresponding to dark current generated from at least one of the plurality of light receivers and a predetermined reset voltage; and
   a controller configured to reset the image sensor if the monitoring voltage detected by the detector becomes lower than a threshold voltage,
   wherein the detector comprises:
   a first detector configured to detect a first monitoring voltage which corresponds to a difference between a dark voltage corresponding to dark current generated from a first light receiver of the plurality of light receivers and the predetermined reset voltage; and
   a second detector configured to detect a second monitoring voltage which corresponds to a difference between a dark voltage corresponding to dark current generated from a second light receiver of the plurality of light receivers and the predetermined reset voltage,
   wherein the controller resets the image sensor if an average value of the first monitoring voltage and the second monitoring voltage becomes lower than the threshold voltage.

5. The imaging apparatus as claimed in claim 4, wherein the threshold voltage is a voltage that is set to correspond to a predetermined photo-sensing speed.

6. A method of controlling an imaging apparatus including an image sensor having a plurality of light receivers, comprising:
   detecting a monitoring voltage which corresponds to a difference between a dark voltage corresponding to dark current generated from at least one of the plurality of light receivers that receive light and a predetermined reset voltage; and
   resetting the image sensor if the detected monitoring voltage becomes lower than a threshold voltage,
   wherein resetting the image sensor is repeated whenever the level of the monitoring voltage becomes lower than the level of the threshold voltage while the at least one of the plurality of light receivers receives the light, and
   the threshold voltage is a voltage that is set to correspond to a predetermined photo-sensing speed.

7. The method of controlling an imaging apparatus as claimed in claim 6, further comprising converting the detected monitoring voltage into a corresponding digital value to output the digital value,
   wherein resetting the image sensor includes resetting the image sensor if the digital value becomes lower than a predetermined threshold value.

8. A method of controlling an imaging apparatus including an image sensor having a plurality of light receivers, comprising:
   detecting a monitoring voltage which corresponds to a difference between a dark voltage corresponding to dark current generated from at least one of the plurality of light receivers that receive light and a predetermined reset voltage; and
   resetting the image sensor if the detected monitoring voltage becomes lower than a threshold voltage,
   wherein detecting the monitoring voltage includes detecting a first monitoring voltage which corresponds to a difference between a dark voltage corresponding to dark current generated from a first light receiver of the plurality of light receivers and the predetermined reset voltage, and detecting a second monitoring voltage which corresponds to a difference between a dark voltage corresponding to dark current generated from a second light receiver of the plurality of light receivers and the predetermined reset voltage, and wherein resetting the image sensor includes resetting the image sensor if an average value of the first monitoring voltage and the second monitoring voltage becomes lower than the threshold voltage.

9. The method of controlling an imaging apparatus as claimed in claim 8, wherein the threshold voltage is a voltage that is set to correspond to a predetermined photo-sensing speed.

10. An imaging apparatus comprising:
an image sensor including a plurality of light receivers to receive light;
a detector to detect a monitoring voltage of at least one of the plurality of light receivers; and
a controller to reset the plurality of light receivers if the monitoring voltage of the at least one of the plurality of light receivers becomes lower than a threshold voltage,
wherein, if the monitoring voltage of the at least one of the plurality of light receivers repeatedly becomes lower than the threshold voltage while the at least one of the plurality of light receivers receives light, the controller repeatedly resets the plurality of light receivers while the at least one of the plurality of light receivers continuously receives light, and
the threshold voltage is a voltage that is set to correspond to a predetermined photo-sensing speed.

11. The imaging apparatus of claim 10, wherein the monitoring voltage corresponds to a difference between a dark voltage and a predetermined reset voltage, and the dark voltage corresponds to a dark current generated by the at least one of the plurality of light receivers.

12. The imaging apparatus of claim 11, wherein the dark current is current generated in response to deterioration of the at least one of the plurality of light receivers as the at least one of the plurality of light receivers continuously operates through continuous light exposure.

13. A method of controlling an imaging apparatus, the method comprising:
detecting a monitoring voltage of at least one of a plurality of light receivers; and
resetting the plurality of light receivers whenever the monitoring voltage of the at least one of the plurality of light receivers becomes lower than a threshold voltage,
wherein the resetting the plurality of light receivers includes repeatedly resetting the plurality of light receivers while the at least one of the plurality of light receivers receives light if the monitoring voltage of the at least one of the plurality of light receivers repeatedly becomes lower than the threshold voltage while the at least one of the plurality of light receivers continuously receives light, and
the threshold voltage is a voltage that is set to correspond to a predetermined photo-sensing speed.

14. The method of claim 13, wherein the detecting a monitoring voltage includes subtracting a dark voltage from a predetermined reset voltage, the dark voltage corresponding to a dark current generated by the at least one of the plurality of light receivers in response to deterioration of the at least one of the plurality of light receivers as the at least one of the plurality of light receivers continuously operates through continuous light exposure.

15. A non-transitory computer-readable medium to contain computer-readable codes as one or more programs to perform the method of claim 13.

* * * * *